United States Patent
Palaniappan et al.

(10) Patent No.: US 11,533,588 B2
(45) Date of Patent: Dec. 20, 2022

(54) METHODS AND SYSTEMS FOR PROVISIONING RATE PLAN FEATURES IN A WIRELESS COMMUNICATION NETWORK

(71) Applicant: T-Mobile USA, Inc., Bellevue, WA (US)

(72) Inventors: Murugappan Palaniappan, Issaquah, WA (US); Henry P. Cyril, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 80 days.

(21) Appl. No.: 17/130,306

(22) Filed: Dec. 22, 2020

(65) Prior Publication Data

US 2022/0201440 A1 Jun. 23, 2022

(51) Int. Cl.
*H04W 4/24* (2018.01)
(52) U.S. Cl.
CPC ..................... *H04W 4/24* (2013.01)
(58) Field of Classification Search
CPC ....................................................... H04W 4/24
See application file for complete search history.

(56) References Cited

U.S. PATENT DOCUMENTS

| 2010/0110890 A1* | 5/2010 | Rainer | H04M 15/8027 370/232 |
| 2016/0316070 A1* | 10/2016 | Bobich | G06Q 40/04 |
| 2022/0051246 A1* | 2/2022 | Barski | G06Q 20/342 |

* cited by examiner

*Primary Examiner* — Kenneth T Lam
(74) *Attorney, Agent, or Firm* — Loeb & Loeb LLP

(57) ABSTRACT

A computer-implemented method for provisioning a feature associated with a brand of a wireless communication network may include loading a trigger condition in a catalog for triggering the feature, wherein an in-memory cache of the catalog is accessible by a network provisioning engine of the wireless communication network. At the network provisioning engine, the method may further include receiving, from a billing system computer, a transaction request for a subscriber having a rate plan associated with the brand, using a brand indication in the transaction request to locate the in-memory cache of the catalog, and determining whether the transaction request meets the trigger condition. If the transaction request meets the trigger condition, the method may further include determining a network node for provisioning the feature, and sending instructions to the network node to provision the feature in the subscriber's rate plan.

9 Claims, 7 Drawing Sheets

METHODS AND SYSTEMS FOR PROVISIONING RATE PLAN FEATURES IN A WIRELESS COMMUNICATION NETWORK

TECHNICAL FIELD

Embodiments discussed herein generally relate to methods and systems that apply trigger conditions for provisioning rate plan features associated with different brands or brands/sub-brands of a wireless communication network.

BACKGROUND

A wireless communication network may have numerous brands and sub-brands (e.g. Metro, Magenta, Magenta Postpaid, Sprint Postpaid, Boost, etc.), which offer different rate plans to their subscribers. The customer segment and the features or services offered by the rate plan may differ substantially between the different brands or brands/sub-brands. For example, prepaid plans may require customers to prepay and have a balance before using a service like making a call, whereas postpaid plans may allow users to accumulate charges and bill the customer at the end of each month. Features such as tethering service, 5G access, the number of gigabytes of online data, unlimited calling, and call forwarding may vary between the different rate plans.

The network provisioning requirements for the features or services provided by the rate plans may differ by brand or brand/sub-brand. In some wireless communication networks, introducing new features or modifying existing features for the different rate plans may occur via a common, cross-brand network provisioning system that includes one or more network provisioning engines (NPEs). Each brand or brand/sub-brand may have a separate catalog maintained in a memory of the provisioning system where the features of the rate plans are defined. More particularly, each rate plan may be translated into a set of features defined by customer facing specifications (CFS) that are captured in the respective brand or brand/sub-brand catalog. In the catalog, each CFS may identify one or more resource facing specifications (RFSs) which define the network nodes impacted by the feature, and each RFS may identify one or more logical resource specifications (LRSs) which are key value pairs that define the name and value that needs to be set at the respective network node. The provisioning system may capture the CFS-RFS-LRS relationships in the respective brand or brand/sub-brand catalog for each rate plan of the network. The NPEs may run algorithms for identifying the appropriate brand or brand/sub-brand catalog, looking up the CFS-RFS-LRS mapping for each rate plan feature, and composing payloads carrying provisioning instructions to send to the appropriate network nodes according to the CFS-RFS-LRS mappings.

While effective, there remains a need for improved strategies for provisioning new features in individual subscriber rate plans via a cross-brand provisioning system. For instance, improvements are needed that allow brands or brands/sub-brands to readily create new rate plans or introduce new or updated features into existing ones with an effective date/time, and to deploy the changes quickly without getting impacted by changes from other brands and/or without bringing down the cross-brand provisioning system to set updates to the individual brand or brand/sub-brand catalogs.

SUMMARY

Embodiments disclosed herein provide a technical solution for improving the provisioning of new or updated features associated with different brands or brand/sub-brands of a wireless communication network via a central, cross-brand provisioning system. In one embodiment, a computer-implemented method for provisioning a rate plan feature associated with a brand of a wireless communication network is disclosed. The method may include loading a trigger condition for the feature associated with the brand in a catalog. An in-memory cache of the catalog may be accessible by a network provisioning engine of the wireless communication network. At the network provisioning engine, the method may further include receiving, from a billing system computer, a transaction request for a subscriber having a rate plan associated with the brand, using a brand indication of the transaction request to locate the in-memory cache of the catalog associated with the brand, and determining whether the transaction request meets the trigger condition. If the transaction request meets the trigger condition, the method may further include determining a network node for provisioning the feature, and sending provisioning instructions to the network node to provision the feature in the subscriber's rate plan.

In another embodiment, a system for provisioning an update to a feature associated with a rate plan of a wireless communication network is disclosed. The system may include the wireless communication network, a billing system computer associated with the wireless communication network, and a network provisioning engine associated with the wireless communication network and in communication with the billing system computer. The network provisioning engine may include a processor, a memory, and a communication circuit. The processor may be configured according to computer-executable instructions for receiving, from the billing system computer, a transaction request associated with an account of a subscriber to the rate plan. The transaction request may include a brand indication of the brand, a unique identifier associated with the subscriber's account, and an old definition for a feature of the rate plan. The processor may be further configured according to computer-executable instructions for using the brand indication to locate an in-memory cache of a catalog associated with the brand, determining whether the old definition is linked with an entry of the catalog specifying a trigger condition for triggering an update of the feature, and determining whether the transaction request meets the trigger condition. If the transaction request meets the trigger condition, the processor may be further configured according to computer-executable instructions for using the catalog to identify a new definition for the updated feature, applying the new definition to identify a network node for provisioning the updated feature, composing a payload with instructions for provisioning the updated feature in the rate plan of the subscriber's account, and sending the payload to the network node.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
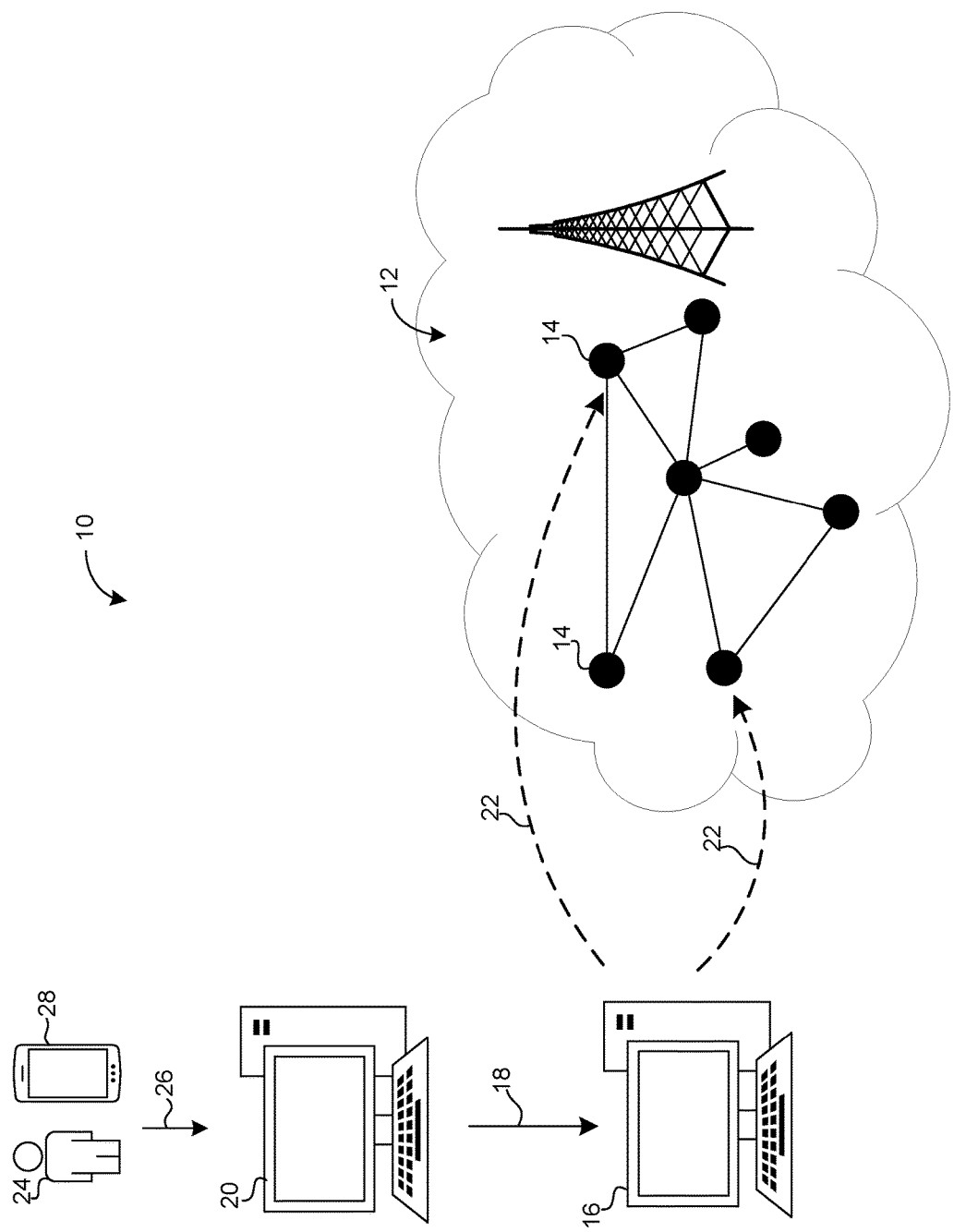
FIG. 1 is a schematic representation of a system for provisioning features associated with rate plans of different brands and brands/sub-brands of a wireless communication network, according to one embodiment.

Referring now to the drawings and with specific reference to FIG. 1, a system 10 for provisioning new or updated features for rate plans associated with different brands or brand/sub-brands of a wireless communication network 12 is shown. The system 10 may include the wireless communication network 12 which may be a 4G long-term evolution (LTE) network, a 5G network, a 4G and 5G integrated network, a WiFi network, or other type of wireless communication network. The network 12 may include a plurality of network nodes 14 which represent connection points that receive, send, create, and/or store data related with the operation of the network 12. Non-limiting examples of network nodes 14 include the home location register (HLR), the home subscriber server (HSS), the charging server (CS), the policy enforcement server, the short message service (SMS) server, and the voice mail server (VMS).

The system 10 may further include one or more network provisioning engines (NPEs) 16 that receive transaction requests 18 from billing system computers 20 and translate the requests into provisioning instructions 22 that are sent to relevant network nodes 14 to implement the new or updated features in individual subscriber rate plans. A subscriber 24 may initiate a transaction 26 via the billing system computer 20 online or at a brick and mortar store. The transaction 26 may be any type of transaction associated with the subscriber's device 28, such as a change in a rate plan, a first time subscription to a rate plan, or even other changes not related to the subscriber's rate plan, such as a purchase of a new device or a change in phone number. As detailed more specifically below, the NPE 16 may send provisioning instructions 22 only for those transaction requests 18 that meet specific trigger conditions that are input into the NPE 16. The trigger conditions may be configurable according to the brand or brand/sub-brand and may be based on time, the transaction number, and traffic load, for example. In this way, the brands or brand/sub-brands of the network 12 may control the effective date and time that that specific features are enabled or disabled for their subscribers, whether this be part of creating new rate plans or modifying features of existing rate plans.

Although only one billing system computer 20 is shown in FIG. 1 for clarity, the NPE 18 may be a centralized, cross-brand provisioning engine that handles transaction requests 18 coming from many different billing system computers 20 associated with different brands or brand/sub-brands of the network 12. When a transaction request is received, the NPE 16 may determine whether the transaction request 18 meets a trigger condition for a particular feature and, if so, may compose a payload with provisioning instructions 22 to send to the appropriate network node(s) 14 to implement the change to the subscriber's rate plan. Specific feature updates to an individual subscriber's rate plan may be provisioned at desired times/dates via the centralized NPE 16 without impacting the transactions of the other brands or brand/sub-brands handled by the NPE 16.

Figure 2:
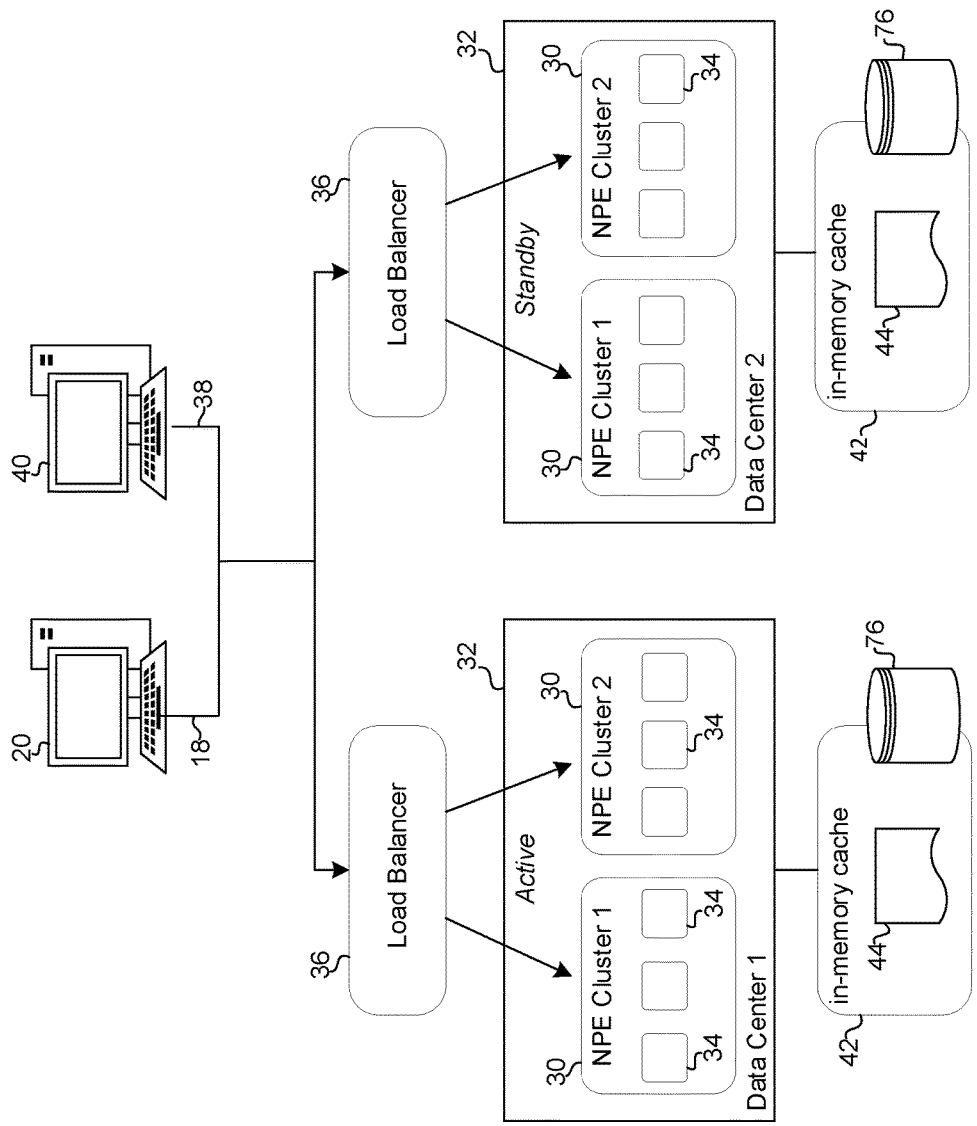
FIG. 2 is a schematic representation of a network provisioning engine (NPE) cluster architecture that may be part of the system of FIG. 1, according to one embodiment.

For scalability and reliability, the system 10 may include multiple clusters 30 of NPEs 16 distributed at two or more data centers 32 to provide backup in case one of the data centers 32 is down or malfunctioning (see FIG. 2). In the exemplary architecture of FIG. 2, two separate data centers 32 each include multiple clusters 30 of NPEs 16, wherein each cluster 30 includes a plurality of virtual machines 34 each executing code for NPE 16 operation. Within each data center 32, if the reliability of one NPE cluster 30 goes down, another cluster 30 may be identified as backup. A load balancer 36 may be associated with each data center 32 to distribute traffic to the respective NPE clusters 30. One data center 32 may serve as the default active data center, and the other data center 32 may be on standby with the data being replicated in the standby data center 32 in case the active data center 32 goes down or malfunctions. The incoming data traffic may include both the transaction requests 18 from the billing system computers 20, as well as feature update instructions 38 (including trigger conditions) that may be input into the NPEs 16 from a network computer 40. The data centers 32 may access an in-memory cache 42 of individual brand or brand/sub-brand catalogs 44 to determine the provisioning payload to apply to the transaction requests. It will be understood that the NPE cluster architecture of FIG. 2 is merely exemplary, and many other arrangements may be used in practice including a single NPE 16, a single cluster 30 of NPEs, or one or several data centers 32 with individual NPEs 16, individual NPE clusters 30, or multiple NPE clusters 30.

Figure 3:
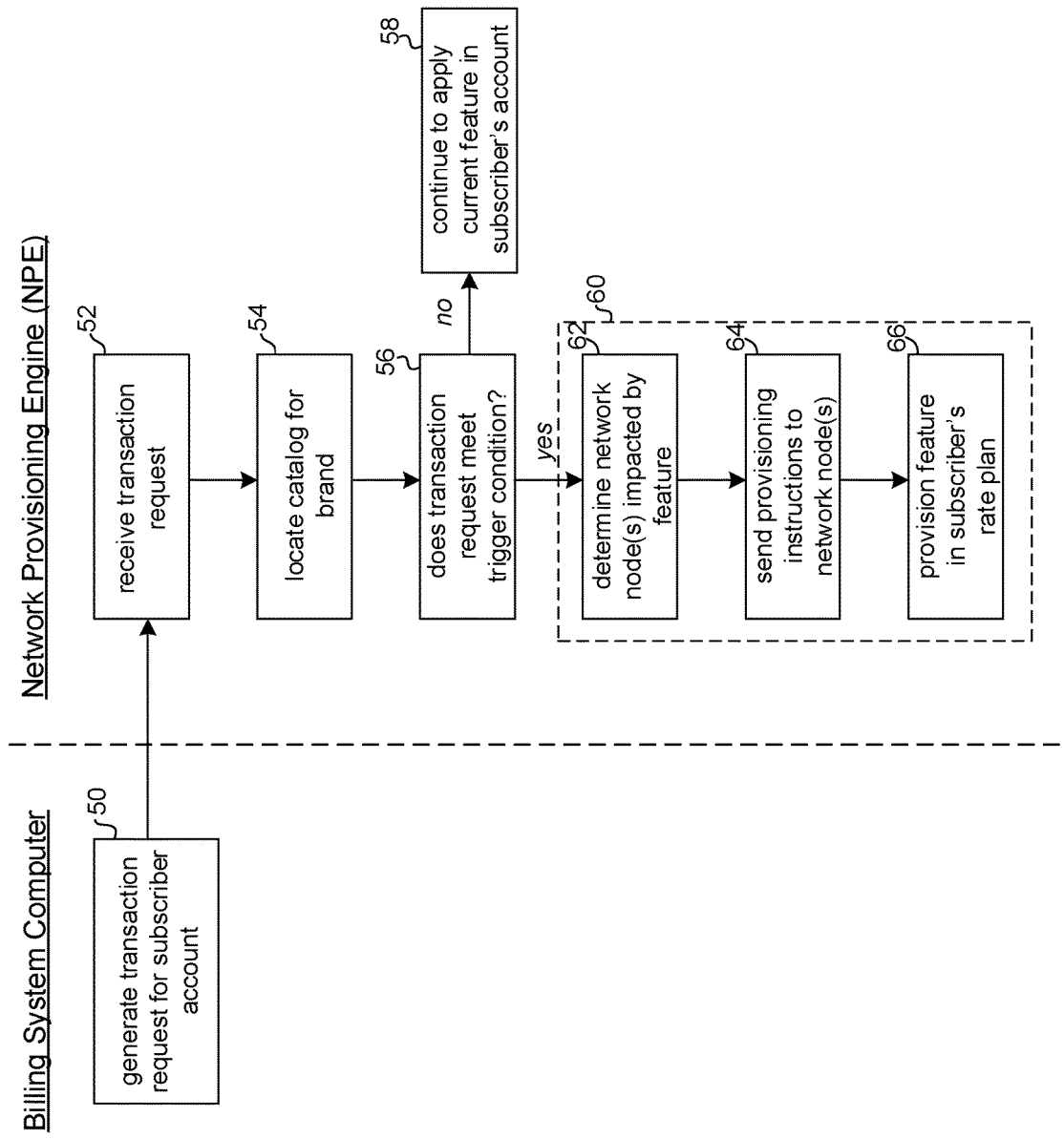
FIG. 3 is a flow chart illustrating an exemplary computer-implemented method for provisioning a feature associated with a subscriber's rate plan in the wireless communication network, according to one embodiment.

Turning to FIG. 3, an exemplary method for provisioning a rate plan feature associated with a brand or brand/sub-brand of the wireless communication network 12 is shown. The method of FIG. 1 is a broad overview of how the NPE 16 may provision rate plan features according to trigger conditions, with more specific and detailed methods being described below in relation to FIGS. 4-6. At a first block 50, the billing system computer 20 may generate a transaction request 18 in response to a subscriber 24 initiating a transaction 26 online or in a brick and mortar store. The transaction request 18 may include a brand indication of the brand or brand/sub-brand, a unique identifier for the subscriber 24 in the billing system database, and a list of definitions for the features in the subscriber's current or pending rate plan. The NPE 16 may receive the transaction request 18 from the billing system computer 20 at a block 52, and may use the brand indication to locate the in-memory cache 42 for the particular brand or brand/sub-brand catalog 44 at a block 54.

If the catalog 44 includes a trigger condition for provisioning a feature, the NPE 16 may determine whether the transaction request 18 meets the trigger condition (block 56). If not, the NPE 16 may continue to apply the current feature in the subscriber's account if a current feature exists (block 58). For example, if the feature update is disabling 5G access, the NPE 16 may continue to enable 5G access in the subscriber's rate plan if the transaction request 18 does not meet the trigger condition specified in the catalog 44. If the transaction request 18 does meet the trigger condition, the NPE 16 may perform feature provisioning 60 according to blocks 62, 64, and 66. Specifically, the NPE 16 may look up information in the catalog 44 to determine one or more network nodes 14 impacted by the feature change (block 62), and send provisioning instructions to the network node(s) 14 (block 64) to provision the feature in the subscriber's rate plan (block 66).

Figure 4:
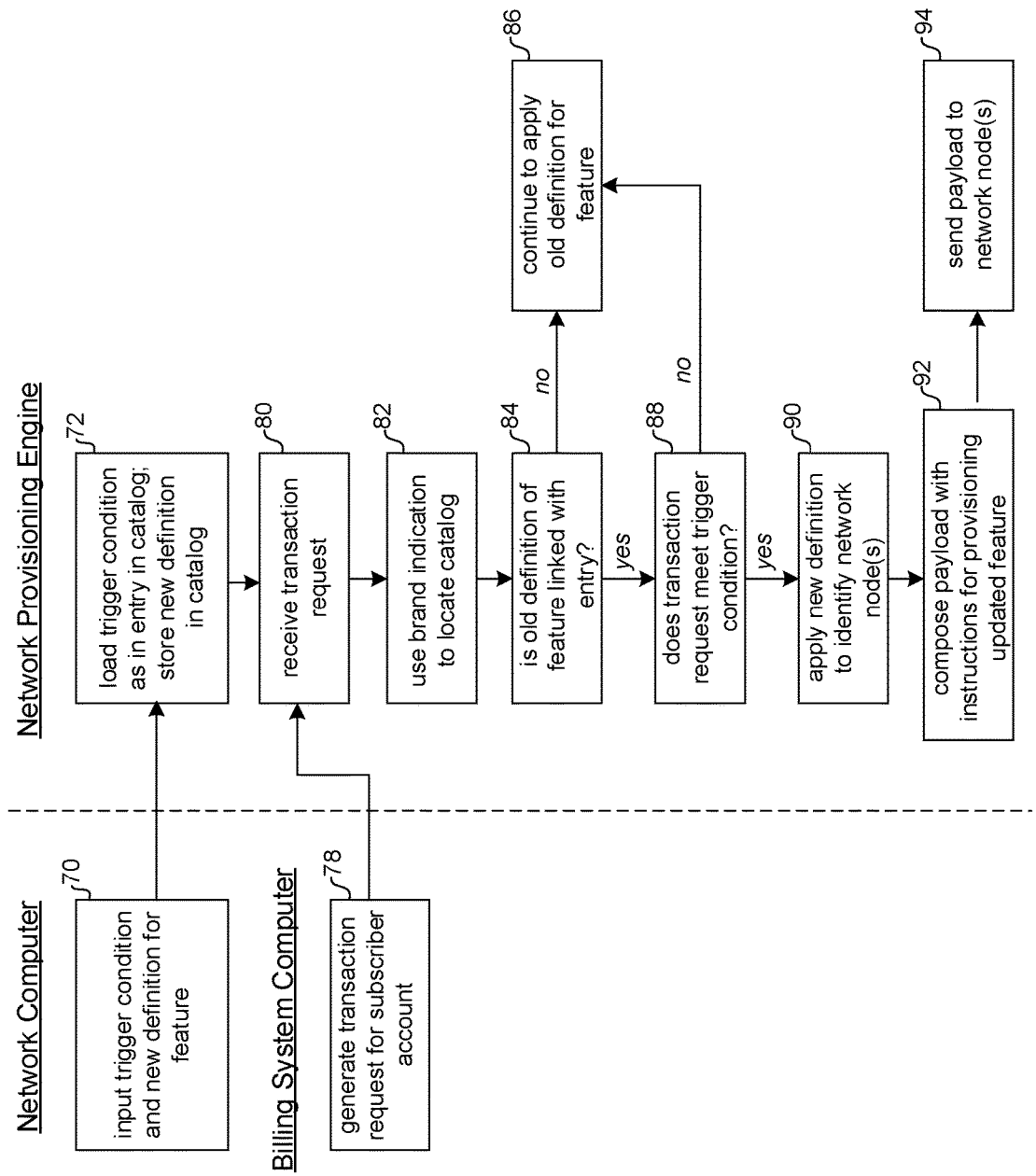
FIG. 4 is a flow chart illustrating another exemplary computer-implemented method for provisioning a feature associated with a subscriber's rate plan in the wireless communication network, according to another embodiment.

Another exemplary method for provisioning a new or updated feature associated with a rate plan of a brand or brand/sub-brand is shown in FIG. 4. At a block 70, the feature update instructions 38 including a trigger condition for provisioning the feature update and a new definition of the feature may be input via the network computer 40. The new definition may carry information regarding the feature including the network node(s) 14 impacted by the feature update, and the provisioning instructions 22 to be sent to the network node(s) 14. At a block 72, the NPE 16 may load the trigger condition as an entry in the catalog 44 associated with the brand or brand/sub-brand, and store the new definition in the catalog 44. In one embodiment, the entry may be loaded into a trigger table 74 in the catalog 44 (see FIG. 6). The block 72 may involve updating the catalog 44 in a database 76 accessible by the NPE 16 (see FIG. 2), and then creating an in-memory cache 42 of the catalog 44 for faster access.

At a block 78, the billing system computer 20 may generate a transaction request 18 for a subscriber's account when a subscriber 24 initiates a transaction. The transaction request 18 may include a brand indication of the brand or the brand/sub-brand, the subscriber identifier for the subscriber's account, and an old definition for the feature that is to be updated. The NPE 16 may receive the transaction request (block 80) and use the brand indication to locate the in-memory cache 42 of the catalog 44 associated with the brand or brand/sub-brand (block 82). At a block 84, the NPE 16 may determine whether the old definition in the transaction request 18 is associated with an entry in the catalog 44 having a trigger condition. If not, the NPE 16 may continue to apply the old definition of the feature (block 86). However, if the old definition is associated with a trigger condition, the NPE 16 may determine whether the transaction request 18 meets the trigger condition at a block 88. If the trigger condition is not met, the NPE 16 may continue to apply the old definition of the feature (block 86). If, however, the transaction request 18 does meet the trigger condition, the NPE 16 may apply the new definition to identify the network node(s) 14 impacted by the feature update and the provisioning instructions (block 90). At blocks 92 and 94, the NPE 16 may compose a payload carrying the provisioning instructions 22, and send the payload to the network node(s) 14 to implement the new or updated feature to the subscriber's rate plan.

In the above methods of FIGS. 3-4, the trigger condition may be based on a variety of predefined conditions such as, but not limited to, a timestamp of the transaction request 18, a clock time that the transaction request 18 was received at the NPE 16, and a clock time that the catalog 44 was updated with the new definition (see further details below in relation to FIG. 6). In other embodiments, the trigger condition may be based on traffic load at the NPE 16, or on the number of transaction requests received. For example, the trigger condition may specify that one out of every n transaction requests 18 received at the NPE 16 will receive the new or updated feature, where n is a predetermined number of transaction requests. In this embodiment, the new feature may be distributed as a win to certain subscribers that happen to initiate the $n^{th}$ transaction request.

Figure 5:
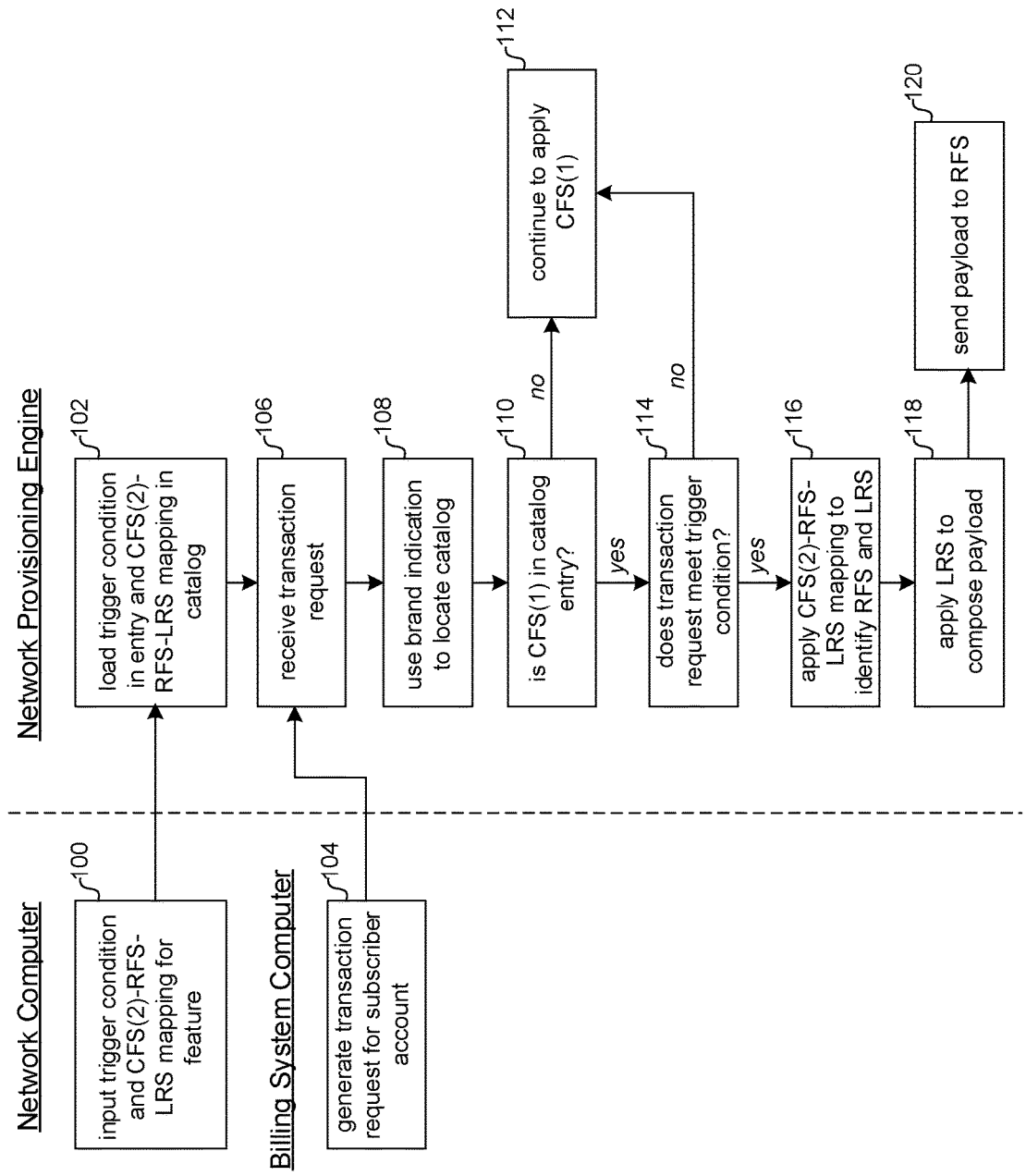
FIG. 5 is a flow chart illustrating another exemplary computer-implemented method for provisioning a feature associated with a subscriber's rate plan in the wireless communication network, according to another embodiment.

A more detailed method for provisioning a new or updated feature in a rate plan of a brand or brand/sub-brand of the wireless communication network 12 is shown in FIG. 5. In this example, the features (new/updated, and old or current) may be defined by a customer facing specification (CFS), the network node(s) 14 impacted by the feature change may each be defined by a resource facing specification (RFS), and the provisioning instructions 22 to be set at each RFS may be defined by a logical resource specification (LRS). Each CFS may define one or more RFSs, and each RFS may define one or more LRSs. Non-limiting examples of CFSs are VOICE_MO_NAT identifying outgoing call feature within the US, CFW identifying call forwarding feature, and TETH_10 GB_CAP identifying tethering up to 10 gigabytes of data that is capped when the limit is reached. In FIG. 5, the old or current feature is defined by a first instance of the CFS (CFS(1)), and the new or updated feature is defined by a second instance of the CFS (CFS(2)). CFS(1) and CFS(2) may have different mappings to different RFSs and/or LRSs, which may be loaded in the in-memory cache 42 of the particular brand or brand/sub-brand catalog 44. That is, the network nodes 14 and the provisioning instructions 22 for the features may be differ between the CFS(1) and CFS(2), and this information may be carried in the in-memory cache 42 of the brand or brand/sub-brand catalog 44.

Referring to FIG. 5, at a block 100, the trigger condition and the mapping of CFS(2) to RFS to LRS (the 'CFS(2)-RFS-LRS mapping') for the new or updated feature may be input into the NPE 14 via the network computer 40, wherein CFS(2) may be mapped to more than one RFS, and each RFS may be mapped to more than one LRS. According to a block 102, the trigger condition may be loaded as an entry in the particular brand or brand/sub-brand catalog 44, and the CFS(2)-RFS-LRS mapping may be stored in the catalog 44. As above, the block 102 may involve updating the catalog 44 in the database 76, and then creating the in-memory cache 42 of the catalog 44. At a block 104, the billing system computer 20 may generate the transaction request 18 for the subscriber 24, with the transaction request 18 including a brand indication of the brand or the brand/sub-brand, the subscriber identifier, and a list of CFSs (or feature definitions) in the subscriber's current rate plan including CFS(1) that is to be updated. At blocks 106 and 108, the NPE 16 may receive the transaction request 18 and use the brand indication to locate the in-memory cache 42 of the respective brand or brand/sub-brand catalog 44.

At a block 110, the NPE 16 may determine whether CFS(1) received in the transaction request is associated with an entry having a trigger condition in the catalog 44. That is, the NPE 16 may determine whether a trigger condition applies to CFS(1). If not, the NPE 16 may continue to apply CFS(1) and the current CFS(1)-RFS-LRS mapping (block 112). If CFS(1) is associated with an entry having a trigger condition, the NPE 16 may determine whether the transaction request 18 meets the trigger condition (block 114). If not, the NPE 16 may continue to apply CFS(1) and the current CFS(1)-RFS-LRS mapping (block 112).

If the transaction request 18 does meet the trigger condition, then the NPE 16 may apply the new CFS(2)-RFS-LRS mapping to identify the RFS(s) and the LRS(s) (block 116). For each RFS that is mapped to CFS(2), the NPE 16 may apply the corresponding LRS to compose a payload carrying the provisioning instructions 22 for what features to set in the subscriber's rate plan (block 118), and send the payload to the RFS to provision the update to the individual subscriber's rate plan (block 120). In this way, the NPE 16 may determine whether each CFS in the transaction request 18 is associated with a trigger condition, and whether the transaction request 18 meets the trigger condition for updating each feature. Accordingly, several features (CFSs) in the subscriber's rate plan may be introduced or updated via the NPE 16. It is noted that the order of the steps of FIGS. 3-5 are merely exemplary, and that the steps may be carried out in different orders or simultaneously in practice. Additionally, the NPE 16 may update several features in the subscriber's account simultaneously according to the above-described methods.

One non-limiting example application of the present disclosure is disabling 5G access in a specific brand. In this example, the wireless communication network 12 may have 5G enabled for all rate plans for all brands and brand/sub-brands prior to 12:00 am on Jan. 1, 2020. The network 12 may input trigger conditions into the NPE 16 to disable 5G access only for brand 1 after 12:00 am on Jan. 1, 2020. All transaction requests of brand 1 coming into the NPE 16 on or after 12:00 am on Jan. 1, 2020 may be set to disable 5G access for the respective subscribers. Subscribers with rate plans associated with the other brands and brand/sub-brands of the network 12 that do not have the trigger condition applied will continue to have 5G access after 12:00 am on Jan. 1, 2020.

Figure 6:
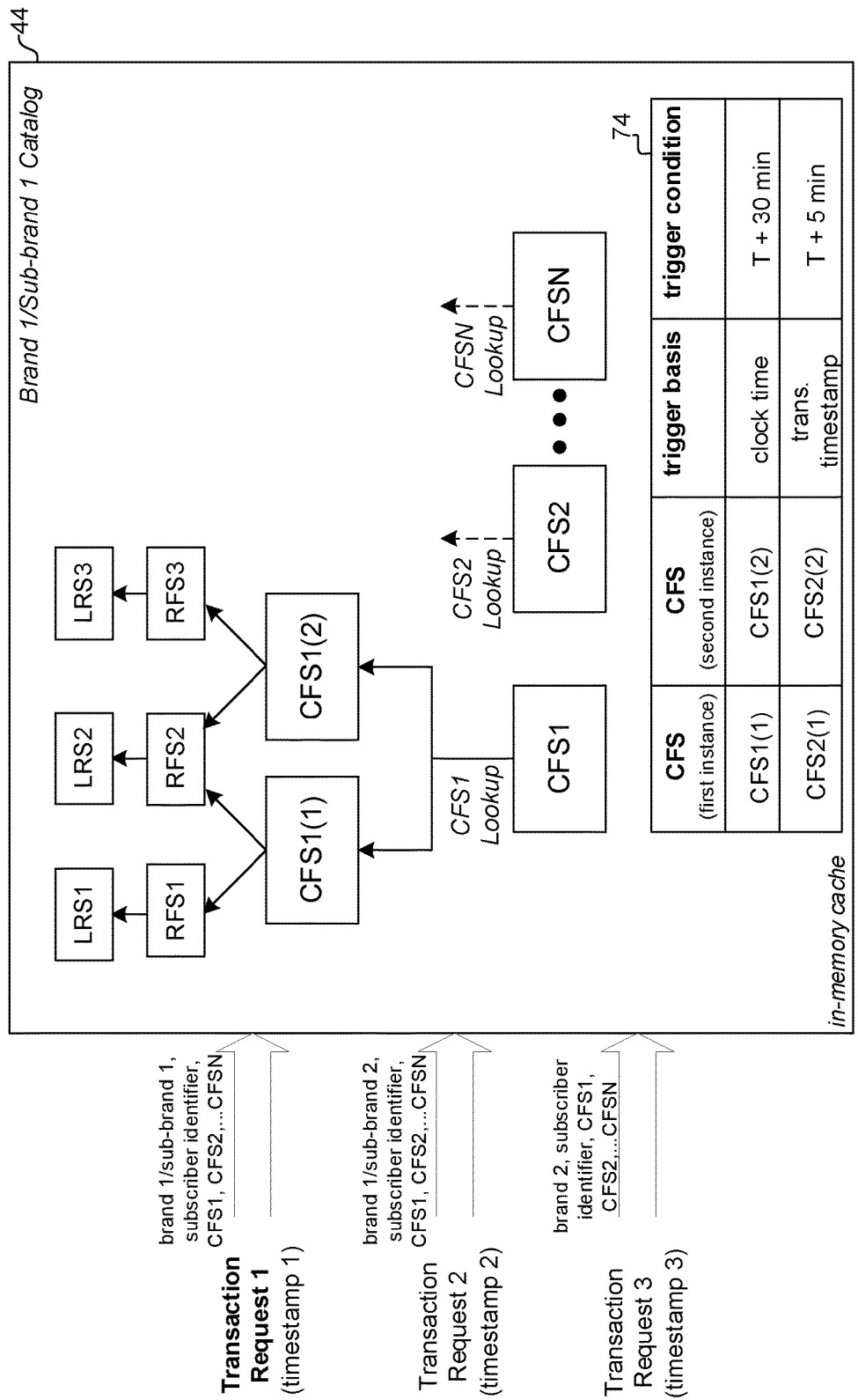
FIG. 6 is a schematic representation of a network provisioning engine (NPE) in operation, according to one embodiment.

Turning to FIG. 6, a schematic representation of the NPE 16 in operation in one exemplary embodiment is shown. The NPE 16 may receive transaction requests coming in from different billing system computers 20 associated with different brands or brand/sub-brands of the network 12 when their subscribers initiate transactions, with each transaction request having a timestamp (e.g., transaction request 1 with timestamp 1, transaction request 2 with timestamp 2, and transaction request 3 with timestamp 3). The payload of each transaction request may include a brand or brand/sub-brand identifier, a subscriber identifier, and a list of CFSs (CFS1, CFS2, . . . CFSN) in the subscriber's rate plan.

Taking transaction request 1 as a specific example, the NPE 16 may locate the corresponding in-memory cache 42 of the brand 1/sub-brand 1 catalog 44, and determine if each CFS in the transaction request is associated with a trigger condition in the trigger table 74 of the catalog 44. For instance, the NPE 16 may determine that the first instance of CFS1 (CFS1(1)) of transaction request 1 has a trigger condition based on the clock time (T) that the NPE 16 was updated with the trigger condition and the mapping of the second instance of CFS1 (CFS1(2)) to RFS and LRS (the CFS1(2)-RFS-LRS mapping). According to the exemplary trigger condition, the trigger condition may be met if the system clock time when the transaction request was received is 30 minutes after clock time (T) that the NPE 16 was updated. If this trigger condition is met, the NPE 16 may look up the mapping for CFS1(2) to provision the feature update. In this example, CFS1(2) is mapped to network nodes RFS2 and RFS3, and RFS2 and RFS3 are mapped to LRS2 and LRS3, respectively. Furthermore, the NPE 16 will no longer apply the mapping for CFS1(1) if the trigger condition is met. Applying the CFS1(2)-RFS-LRS mapping, the NPE 16 may compose a payload with provisioning instructions to RFS2 and RFS3.

For CFS2 of transaction request 1, the trigger condition for the second instance of CFS2 (CFS2(2)) is based on transaction timestamp, whereby the trigger condition is met if the timestamp of the transaction request is 5 minutes after the time (T) that the NPE 16 was updated with the trigger condition and the CFS2(2)-RFS-LRS mapping. If this trigger condition is met, the NPE 16 may apply the mapping associated with CFS2(2) to compose the payload for the corresponding network node(s). Once the trigger conditions are met for a particular CFS, the trigger conditions may be cleared from the trigger table 74, and the old mappings for the CFSs no longer in use may be cleared from the catalog 44.

Figure 7:
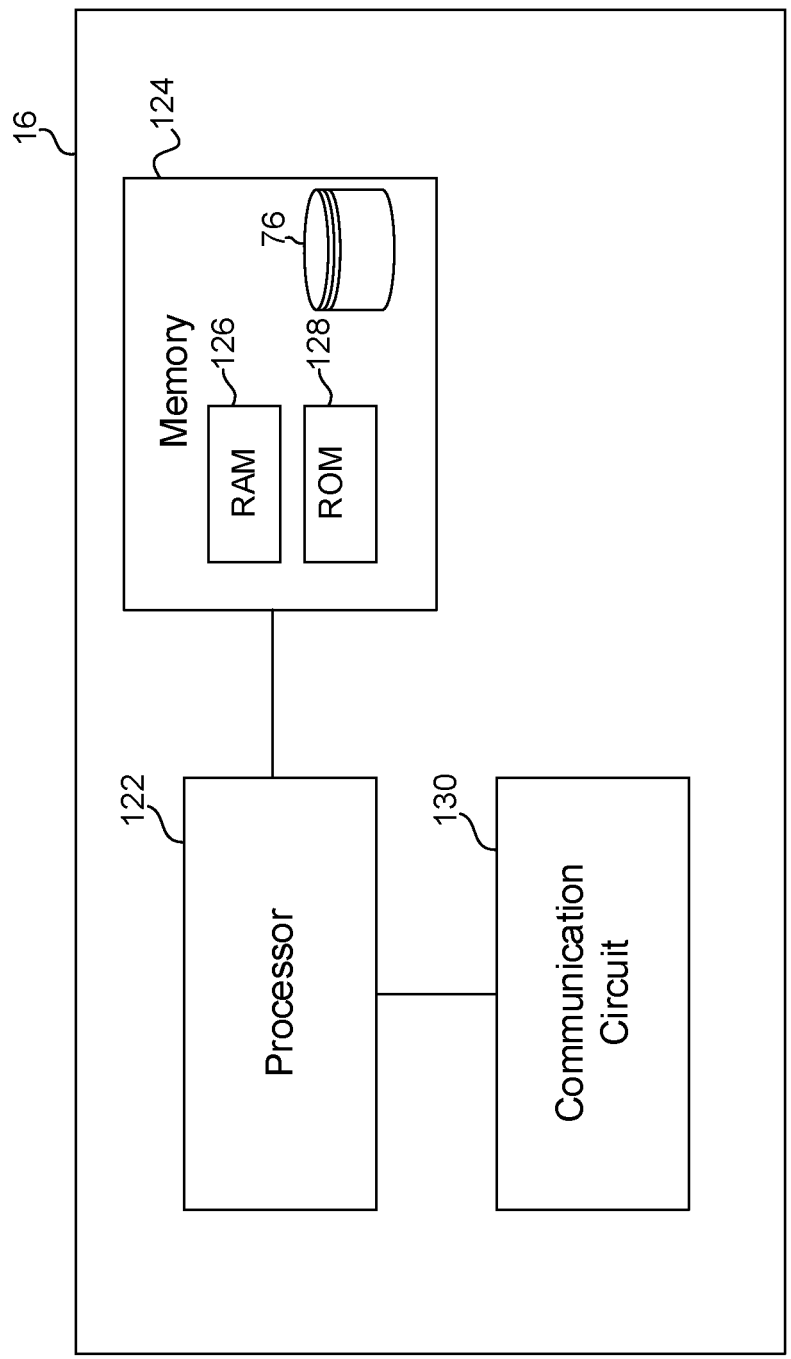
FIG. 7 is a schematic representation of the NPE, according to one embodiment.

FIG. 7 is a simplified schematic representation of the NPE 16. The NPE 16 may include a computer system having a processor 122 configured to execute computer-executable instructions for performing the aforementioned functions such as retrieving the appropriate brand or brand/sub-brand catalog 44 when a transaction request is received, determining whether the transaction request meets a trigger condition specified in the catalog 44, and looking up relevant CFS-RFS-LRS mappings in the catalog to compose a payload for provisioning the new or updated features. A memory 124 may store the computer-executable instructions and assist the processor 122. The memory 124 may include a random access memory (RAM) 126, a read-only memory (ROM) 128, and the database 76 storing data such as the brand and brand/sub-brand catalogs. The in-memory cache 42 of the catalog data may be stored in the RAM 126 for faster access. The NPE 16 may further include a communication circuit 130 for receiving and transmitting data to other components of the system 10 such as the network computer 40, the billing system computer 20, and the network nodes 14.

The methods and systems described herein may be adapted to trigger changes associated with other types of transactions as well, such as consumer purchase transactions. For example, a merchant server may maintain an in-memory cache to trigger a price change for a product at a specific time (e.g., 12:00 am) on a specific day. Online consumer purchase requests coming into the merchant server before the trigger time will have the original product price applied, whereas those coming in after the trigger time will have the updated product price applied. In such arrangements, the feature provisioning 60 steps of FIG. 3 may be replaced with relevant steps for provisioning the updated product price in the merchant server environment when the predetermined trigger condition (e.g., time, transaction request number, etc.) is met.

The present disclosure introduces a strategy for triggering the provisioning of new or updated features in rate plans via a cross-brand provisioning system. The triggering conditions are input into the provisioning system and automatically applied via the NPE, allowing control over the effective date/time that the new or updated features are provisioned for individual subscriber rate plans per brand needs, without impacting the other brands and sub-brands that are handled by the provisioning system. Triggering conditions and updates to the in-memory cache of each catalog may be set in the NPE without bringing down the cross-brand provisioning system. The catalogs are updated in memory to speed up the provisioning process. These advantages translate into an improvement in network function, particularly at the level of the NPE, for automating feature updates for new or existing rate plans of specific brands according to predefined triggers.

What is claimed is:

1. A computer-implemented method for provisioning a rate plan feature associated with a brand of a wireless communication network, comprising:
    loading a trigger condition for triggering the feature associated with the brand in a catalog, an in-memory cache of the catalog being accessible by a network provisioning engine of the wireless communication network; and at the network provisioning engine, receiving, from a billing system computer, a transaction request for a subscriber having a rate plan associated with the brand, the transaction request including a brand indication of the brand, using the brand indication to locate the in-memory cache of the catalog associated with the brand, determining whether the transaction request meets the trigger condition, and if transaction request meets the trigger condition, determining a network node for provisioning the feature, and sending provisioning instructions to the network node to provision the feature in the subscriber's rate plan.

2. The computer-implemented method of claim 1, wherein the trigger condition is based on a clock time that the trigger condition was loaded in the catalog.

3. The computer-implemented method of claim 1, wherein the trigger condition is based on a timestamp of the transaction request.

4. The computer-implemented method of claim 1, wherein the trigger condition is met for one out of every $n^{th}$ transaction request received at the network provisioning engine, and wherein n is a predetermined number of transaction requests.

5. The computer-implemented method of claim 1, wherein loading the trigger condition in the catalog includes loading the trigger condition at two or more data centers associated with the wireless communication network, and wherein each of the data centers includes a cluster of the network provisioning engines.

6. The computer-implemented method of claim 1, wherein determining whether the transaction request meets the trigger condition comprises locating the trigger condition in an entry in a trigger table of the catalog.

7. The computer-implemented method of claim 6, wherein the feature is defined by a second customer facing specification (CFS), the network node is defined by a resource facing specification (RFS), and the provisioning instructions are defined by a logical resource specification (LRS), and wherein a mapping of the CFS to the RFS and the LRS is defined in the catalog.

8. The computer-implemented method of claim 7, wherein the transaction request includes a first customer facing specification (CFS) defining an old or current definition of the feature, and wherein determining whether the transaction request meets the trigger condition includes using the first CFS to locate the entry in the trigger table with the trigger condition.

9. The computer-implemented method of claim 8, wherein determining the network node for provisioning the feature comprises determining the RFS mapped to the second CFS in the catalog.

\* \* \* \* \*